June 21, 1966  T. W. DUNBAR  3,256,614
PLANT FOR DRYING OF FINELY DIVIDED MATERIAL, ESPECIALLY
WOOD PULP AND CELLULOSE
Filed April 13, 1962

United States Patent Office 3,256,614
Patented June 21, 1966

3,256,614
PLANT FOR DRYING OF FINELY DIVIDED MATERIAL, ESPECIALLY WOOD PULP AND CELLULOSE
Thomas W. Dunbar, Rosemere, Quebec, Canada, assignor to D. & S. Engineering Limited, Montreal, Quebec, Canada, a corporation
Filed Apr. 13, 1962, Ser. No. 187,424
Claims priority, application Norway, May 29, 1961, 140,363
5 Claims. (Cl. 34—48)

The invention relates to a plant for drying of finely divided material. The invention is especially designed for use in connection with the drying of wood pulp and cellulose, and will in the following be described as applied to this end.

It will be understood, however, without further explanation that the invention is not confined to this use, but that the plant according to the invention can also be used for the drying of other finely divided material.

More specifically the invention relates to a plant in which the material is dried into a very finely pulverized state, the drying itself being effected by very rapid, almost instantaneous evaporation, when the small separated particles meet a hot gas or air current and are carried with great velocity by this current through the drying plant. Such a plant may comprise several drying stages, each consisting of a drying chamber, a blower and a cyclone separator, which drying stages are so connected that the drying material, suspended in a gaseous medium, can be caused to pass the drying stages in series, a blower being installed on the inflow side and a cyclone on the outflow side of each drying chamber. The plant comprises, further, a furnace for delivery of a hot, gaseous drying medium to the inflow side of each drying chamber. The furnace can be powered by an oil-fuelled or electrically heated air preheater or by a heat exchanger with steam as source of heat.

It is a principal object of the invention to provide an improved heat supply system in which a hot gas drawn from a suitable source is massed and is maintained at a predetermined temperature and pressure to permit very large accurately measured quantities of gas at closely controlled temperatures to be supplied upon demand to will balance very substantial variations in the amount of one or more of said drying stages, within the capacity of the system.

More specifically it is an object of the invention to provide for rapid variations in quantity of heated gas supplied simultaneously to each of the several drying stages through which the material to be dried is passed which pulp being passed through the system. A rapid change in temperature at any particular stage of the process is an indication of a change in the volume of pulp passing through said stage and is instantly met by a corresponding increase or decrease in the mass of the heated gaseous medium supplied to said stage in order to restore the temperature in said stage to the desired level.

It is a further object of the invention to provide a suitable means for massing hot gas simultaneously from a plurality of supply sources, in two adjoining areas at substantially different temperatures and including means for effecting a controlled exchange of said gases between said areas in order that said gases may be available in the amounts and at the temperatures required to supply each of the several stages of a process at the desired pressure and temperature.

Other objects of the invention are to provide a hot gas supply system utilizing a plurality of heat sources which may have widely different temperature capacities, and in which it may be required that most of the drying capacity will be supplied from a low heat source.

An essential feature of the present invention consists in the provision of a large gas distributing chamber into which a heated gaseous medium is conveyed to provide a substantial mass of said heated gaseous medium which is maintained at a desired temperature and pressure and which is of sufficient capacity to permit said heated medium to be distributed to each of the several stages of the drying processes at such temperature and in such amounts as may be needed to maintain the entire process in operation.

Another feature of the invention consists in the provision of a distributing chamber particularly adapted for use with two heat sources from which a hot gaseous medium is supplied at different temperatures, and in different amounts, said distributing chamber being constructed in two sections, which are connected with the respective heat sources and which are connected to one another by means of a regulating damper.

The gas-distributing chamber is conveniently fitted with an inlet for the hot drying medium and a number of outlets corresponding to the number of drying stages, one for each drying chamber.

To make the invention more easily understood a detailed description will now be given of the same in conjunction with the drawings, which show, quite schematically, two embodiments of a plant according to the invention.

Figure 1:
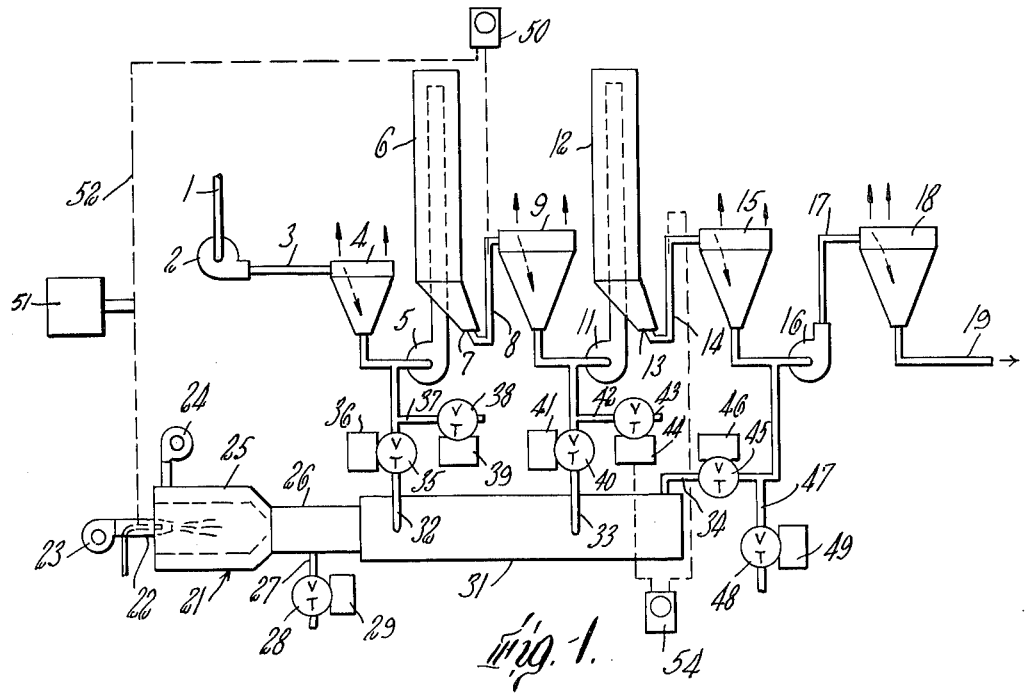
FIG. 1 shows a plant with a furnace with non-divided distributing chamber, and three drying stages, each comprising a drying chamber.

In FIG. 1, 1 denotes a pipe for supply of a gaseous carrying medium, in which the aqueous material which is to be dried is suspended in finely divided state.

2 is a fan for conveyance of the bearing medium and the material. From the fan a pipe 3 leads to a cyclone separator 4, in which a part of the bearing medium, e.g. air, is exhausted vertically upwardly to the atmosphere, while the material to be dried and a small portion of the bearing medium are drawn through the bottom cone and conducted to the suction side of a fan 5. By means of fan 5 the material to be dried is now blown up through the inner uplifting tube in the tower-shaped drying chamber 6 and passes downwardly outside of said tube. The material to be dried arrives at the lower outlet end 7 of the tower, whence through a pipe 8 it reaches a cyclone separator 9.

From the separator 9 the material is conveyed to the second drying stage, where it arrives on the suction side of the fan 11. The material now passes through the tower-shaped drying chamber 12 and out at the lower outlet end 13 of this, and flows through the pipe 14 to a cyclone separator 15. From the separator 15 the material is conveyed to a third drying stage. This has a somewhat simplified construction and consists merely of the fan 16 and the pipe 17. It is assumed that the pipe 17 will be given such a length that it can take the place of a drying tower. From the pipe 17 the material passes to a final cyclone separator 18 and is then conducted from the outlet end of this through the pipe 19 onwards for further processing.

As will be understood without further explanation, there is per se nothing to prevent the third drying stage being devised in the same way as the first and second.

The part of the plant which has been described hitherto is of known construction and represents in that respect no part of the invention.

21 denotes an oil-fuelled combustion chamber for production of a gaseous drying medium. 22 is a burner, viz. an oil-burner, 23 a fan for supply of primary air and 24 a fan for supply of secondary air. The secondary air is conveyed to a mantle, which surrounds the combustion chamber proper.

26 is a duct which conveys the combustion gases from the furnace 21 to a distributing chamber 31. 27 is an air-supply duct fitted with a throttle 28, which can be adjusted by means of an automatically controlled regulator 29.

From the distributing chamber 31 there are installed a number of gas outlets, corresponding to the number of drying stages. In the embodiment shown in FIG. 1 there are, as already mentioned, arranged three drying stages and the gas-distributing chamber is provided with three gas outlets 32, 33 and 34.

It will, however, be readily understood that the plant can be devised with fewer or with more drying stages than three, and the gas-distributing chamber be furnished in such case with a similar number of gas-outlets.

In the gas-outlet 32 there is fitted a regulating throttle 35 with regulator 36. 37 is an air-inflow pipe, likewise provided with an adjustable throttle 38 with regulator 39.

Through the gas-outlet 32 the hot gas comes from the distributing chamber 31 to the inflow side of the fan 5. Here the gaseous medium from the cyclone 4, in which the material to be dried is suspended, is mixed with the hot drying medium, and is blown together with this up into the drying chamber 6, as previously described.

The gas-outlet 33 leads from the distributing chamber 31 to drying stage 2. The gas-outlet 33 is, like gas-outlet 32, provided with a throttle 40 with regulator 41 and with air-intake 42 with adjustable throttle 43 and regulator 44.

In a wholly similar way the gas-outlet 34 leads to drying stage 3. Here too 45 denotes a throttle with regulator 46. 47 is an air-intake with an adjustable throttle 48 and regulator 49.

A brief outline of the operation of the pulp drying plant shown in FIG. 1 follows:

Pulp is fed to the process through the fan 2 at the rate of 15,000 cubic feet per minute, and at a starting temperature of 70° F. The mixture of pulp and heated air including an admixture of the heated gaseous medium from the distributing chamber 31 is passed through the fan 5 at a rate which may be assumed to be 56,000 cubic feet per minute. The temperature of the process at this point, as a result of the admixture of the heated gaseous medium from the distributing chamber 31, is raised to 500° F. The cyclone discharge temperature at the location of the first stage cyclone separator 9 is maintained at 170° F. At the location of the fan 11 forming part of the second stage, the mixture including the material to be dried, the carrying medium, and a further addition of the heated medium from the distributing chamber 31 raises the temperature again to 350° F. The temperature of the mixture as it leaves the second stage cyclone separator 15 will be at an approximate level of 150° F. The temperature of the mixture as it leaves the process may be approximately 70° F.

The mechanism provided for controlling the temperature of the heated gaseous medium in carrying out the several stages of the drying process as shown in FIG. 1 comprises a temperature controller 50 which is actuated by means of a heat sensing element disposed in the pipe 8 leading to the cyclone separator 9 of the first drying stage. Said temperature controller 50 acts through a control unit 51 in connecting circuit 52 to control the output of the furnace 21, for example, by varying the heat or oil input of the furnace which thus tends to raise or lower, as the case may be, the over-all temperature of the gas massed in the distributing chamber 31. Assuming, for example, that the desired temperature norm in the pipe 8 is 170° F., any decrease in the temperature of the pulp and carrying fluid mixture below 170° F., causes the heat output of the furnace to be increased, raising the temperature of the heated gaseous medium supplied to the distributing chamber 31. This increase will immediately affect in a similar manner the amount of heat supplied to all of the stages of the process.

A second temperature controller 54 is provided having a heat sensing element disposed in the pipe 14 leading to the second stage cyclone separator 15. Said temperature controller 54 is connected with the adjustable throttle 43 and regulator 44 for controlling the amount of air from atmosphere admitted into pipe 33 to the process at the location of the second stage fan 11. The temperature controller 54 thus acts to vary the temperature in this second stage and again controls the drying of the pulp as it passes through the second stage of the drying process.

It will be understood that the figures above given are representative only and are capable of wide variations to meet individual conditions. From an inspection of the above given description, it will be readily appreciated that a large and continuous supply of the gaseous heated medium must be supplied to carry out the drying process, and it will be further evident that the heat system employed must have a very large capacity and a high degree of flexibility to maintain the gaseous medium at the desired pressures and temperatures during all stages of the process.

Figure 2:
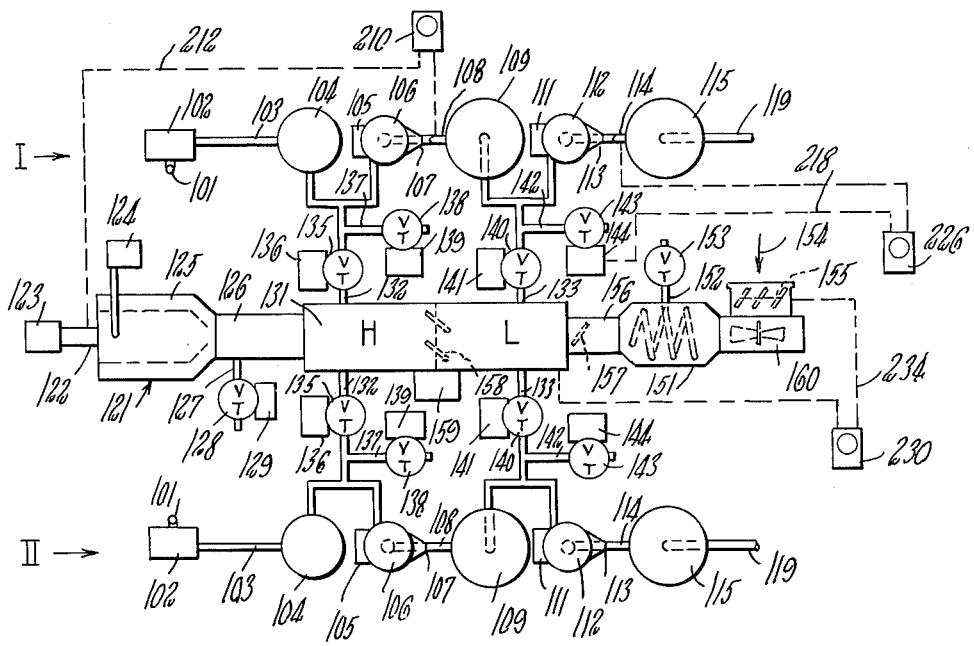
FIG. 2 shows a plant with a furnace with a distributing chamber divided into a high-temperature and a low-temperature zone, and with two drying stages, each comprising two parallel coupled drying chambers.

FIG. 2 shows a somewhat more complicated embodiment of the invention.

It is distinguished from the embodiment in FIG. 1 firstly by the fact that it is devised as a double set drying stage, so that the material to be dried moves in the form of parallel strands through the two sets, each comprising two stages.

In the drawing the two sets or strands are shown in mirror-symmetrical form around the axis of the gas-distributing chamber, but in practice the two sets will suitably be arranged parallel side by side.

Further, the embodiment according to FIG. 2 is distinguished from the one shown in FIG. 1 by the fact that the gas-distributing chamber is divided into a high-temperature zone, to which a drying medium at a relatively high temperature is conveyed from an oil-fueled furnace, and a low-temperature zone, to which a drying medium of lower temperature is conveyed from a steam-heated heat exchanger.

The plant will now be described in greater detail.

The set of drying stages shown at the top of the drawing, denoted I, comprises a number units 101–115, which correspond exactly to the units 1–15 in FIG. 1. According to FIG. 2 there are, however, in each set only two drying stages, and the material is conveyed therefore from the cyclone separators 115 directly to a pipe 119 for further processing, while from the cyclone separator 15 according to FIG. 1 it is conveyed to a third drying stage, before it is conducted through pipe 19 onwards for further treatment.

The two drying stages shown at the bottom of FIG. 2, denoted II, are devised exactly like the drying stages at the top of the figure, and do not therefore require detailed description.

The gas-distributing chamber is in FIG. 2 denoted 131. At the left end of this there is installed an oil-fueled furnace 121, which it is presumed will be executed in exactly the same way as the furnace 21 in FIG. 1. Thus the units 121 to 129 inclusive in FIG. 2 correspond exactly to the units 21 to 29 inclusive and do not require further description.

The same applies to units 132 to 139 inclusive.

The plant shown in FIG. 2 is distinguished, however, from the plant in FIG. 1 by the fact that at the other end of the gas-distributing chamber 131 there is likewise installed a furnace which in the embodiment illustrated it is presumed will consist of a steam-heated heat-exchanger 151. 152 is a pipe for supply of steam and 153 an adjustable valve for the steam. The air is supplied at 154, and 155 is an adjustable air throttle. 160 is a fan.

From the heat-exchange the heated air passes through a pipe 156 to the right end of the gas-distributing chamber 131. 157 is a throttle for closing the supply of air from the heat-exchanger.

An essential feature of the plant according to FIG. 2 is, further, that the gas-distributing chamber, already mentioned is divided into a high-temperature zone H and a low-temperature zone L. The division is effected by means of a throttle 158. The throttle can be adjusted by means of a regulator 159. In the example shown it is contemplated that the gaseous drying medium in the high temperature zone can be heated to approximately 500° Fahrenheit, and that the gaseous drying medium in the low temperature zone will be heated to approximately 300° Fahrenheit. It will be understood that these temperatures are an approximation only and may be varied over substantial limits. The high temperature zone is adapted for the very rapid drying of wet material, this extreme heat being applied only for a very limited period and the material being projected into a lower temperature zone drying stage before any deleterious effect is produced on the finely divided material. The result is to produce the most efficient as well as rapid drying out of the material to be subsequently pressed and packaged in the usual manner.

The outlet pipe 132 already mentioned is taken from the high-temperature zone, while an outlet pipe 133 passes from the low-temperature zone to the second drying stage. The units 140, 141, 142, 143 and 144 correspond to the units 41, 42, 43 and 44 in FIG. 1.

The working of the plant shown in FIG. 2 will appear from the introductory description, but will nevertheless be briefly described here in connection with the figure.

By means of the oil-fuelled furnace 121 a hot drying medium is conveyed to the high temperature zone H. By means of the heat-exchanger 151 a drying medium having a substantially lower temperature is conveyed to the low-temperature zone L. If the throttle 158 is completely closed, the hot drying medium will be conveyed to the first drying stage, and the moderately heated drying medium to the second drying stage.

By opening the throttle 158 and at the same time regulating the supply of heating medium to the high-temperature zone or low-temperature zone respectively it will be possible to cause the drying medium to flow over from the one zone to the other, where a mixing will be effected.

Thus, if, for example, more hot drying medium is conveyed to the high-temperature zone than is taken out through the outlet pipe to the first drying stage, part of the hot drying medium will flow over to the low-temperature zone.

The opposite may be effected if the supply of hot air from the heat-exchanger 151 is increased relatively to the takeout of hot air to the second drying stage.

If we suppose now that the steam-heated heat-exchanger is for some reason or other temporarily put out of function, the plant can be operated solely by means of the oil-fuelled furnace 121. This will then supply both the zones H and L in the gas-distributing chamber with drying medium.

A brief outline of the operation of the pulp drying plant shown in FIG. 2 of the drawings follows:

It is assumed that each of the fans 105, 111 for the first and second stages of the process and similarly each of the identical fans in the parallel unit has a capacity of 23,000 cubic feet per minute. The temperature of the mixture as it passes through at the fan 105 associated with the first drying stage is 500° F. At the location of fan 111 associated with the second drying stage the temperature of the mixture is set at 350° F. It is assumed that the same operating conditions prevail with respect to the first and second stages of the duplicated drying unit mounted in parallel relation to the pulp drying stages above described.

In carrying out the process the furnace output for the high heat furnace unit 121 is assumed to be in the order of 6.5 million B.t.u.'s per hour. The output from the steam heater 151 supplying the heated gaseous medium at a somewhat lower temperature is assumed to be about 25 million B.t.u.'s per hour, the temperature of the heated gas discharged from this latter heater being about 350° F. During operation, the temperature of the heat exchanger 151 is maintained relatively constant. In addition to the several permanently set controls for adjusting the temperature of the heated gas by the admixture of cold air to the process located in the several inlet and outlet passageways to and from the distributing chamber, a temperature controller 210 is provided having a heat sensitive element which is disposed in the connecting pipe 108 to the cyclone separator 109 for the first stage of the process. The temperature controller is connected by means of a circuit 212 with the oil or heat input element of the furnace 121, the arrangement being such that any variation in the temperature of the mixture passing through the pipe 108 above or below a predetermined level which in the present instance is assumed to be 170° F. will effect a corresponding correction in the temperature of the drying medium output of furnace 121, thus increasing or decreasing as necessary the temperature of said medium in the H portion of the discharge chamber 131 to restore the temperature of the mixture approaching the second stage of the process. A second temperature controller 226 is provided which has a heat sensitive element introduced into the connecting pipe 114 to the cyclone mixture 115 of the second stage of the process, and is connected by means of a circuit 218 with the regulator 144 of the unit 143 for controlling an admixture of cool air into the conduit 133 for supplying the heated gaseous medium from the low side of the distributing chamber 131 to the area of fan 111 of the second dryer unit. It is assumed for the purpose of this description that the temperature of the heating unit within the heat exchanger 151 is a constant determined by the characteristics of the supply of the heating medium to said heating element. Variations of the temperature in said connecting pipe above or below a predetermined norm has the effect of correspondingly increasing or decreasing the amount of cold air added to said gaseous medium.

In the alternate construction shown in FIG. 2, an additional temperature controller 230 is provided having a heat sensitive element which is introduced into the L section of the distributing chamber 131 and which operates through an electrical circuit 234 to control the position of the inlet damper 155 on the fan 160 for supplying hot gas to the L section of the distributing chamber 131. In the arrangement shown it is assumed that a temperature of 500° F. will be maintained in the H section of the distributing chamber and a temperature of 350° F. will be maintained in the L temperature section of the distributing chamber. The temperature controller 230 is thus set so that any tendency of the temperature in the L section to decrease below 350° F. will cause the damper 155 to open thus increasing the admixture of the heated gas whereas an increase in the temperature of the L section above 350° F. will have the effect of closing said damper.

The installation of such a gas-distributing chamber affords a number of advantages.

Between the furnace or heat source and the distributing chamber there is a duct or pipe, which can be fitted with an inlet for securing a suitable mixture of combustion gas and air. In the gas-distributing chamber there is effected a continued mixing of air and combustion gases, whereby is ensured a uniform temperature and homogeneous gas mixture.

In the connecting pipes which lead from the gas-distributing chamber to the respective drying stages, throttles can be fitted for regulating quantity and pressure, and in addition air inlets can be fitted, with adjustable throttles for the supply of different amounts of extra air.

By means of the distributing chamber there is obtained a stable reservoir of gaseous drying medium, it being possible by a suitable regulation of the supply to keep this under constant, preset pressure.

As will be understood, it is a characteristic feature of the plant according to the invention that the material which is to be dried is conveyed in series through the different drying stages, while the drying medium from the gas distributing chamber is conducted in parallel outlets to the respective drying stages.

Each drying stage can, depending on the size of the plant, comprise one or several drying chambers, it being possible, if necessary, to couple two or more drying chambers parallel in each stage.

The installation of a gas-distributing chamber makes possible, further, the employment of a combination of an oil fuelled furnace for production of a hot, gaseous drying medium, e.g. with a temperature of about 500° F., and a steam-heated heat exchanger for production of a drying medium with relatively lower temperature (e.g. of about 300° F.).

In many cases a manufacturer will have steam at disposition, and it will be economically advantageous then to use the steam for heating of the drying medium. A very high steam pressure is, however, required to enable the steam alone to give to the drying medium a sufficiently high temperature. The use of a gas-distributing chamber makes possible in a simple way the combination of a steam heat exchanger with an oil-fuelled or electric furnace.

When such combined heating is employed, the gas-distributing chamber is, according to an advantageous embodiment of the invention, divided up into a high-temperature and a low-temperature zone. The division can be effected by means of a partition wall with adjustable apertures, and the plant can be so operated that either a hot drying medium flows over into the low-temperature zone, to mix there with the low-temperature medium, or in such a way that the low-temperature medium flows over into the high-temperature zone. From each zone the drying medium is drawn out to one or more drying chambers. In this way it becomes possible to get a very good regulation of the temperature of the drying medium. The temperature of the hottest medium can, for example, easily be changed during operation, in order to be adapted to the conditions, and even if the low-temperature medium has to be kept at constant temperature, it is possible by means of a certain selected drying temperature to divide the load on (consumption of) the two drying media at choice. For practical purposes this may have great value in the processing of different materials in that a larger or small quantity of steam may be made available according to the immediate working conditions in the cooking section, the evaporating and other sections.

At the same time it will be possible, in the event of the steam-heating heat exchanger for any reason being out of function, to operate the plant exclusively with the hot gas furnace, as this will then be able to supply both zones of the distributing chamber with the drying medium. The temperature of the latter can be the addition of air at various points, as will appear from the following description, be so regulated that it is adapted to each single stage of the drying. Thus it will be possible to work with full or reduced capacity, dependent on the size of the combustion chamber with appurtenant equipment selected.

Various advantages which can be obtained by use of the invention will appear from what has been said above. The reservoir containing the drying medium can, as mentioned, be kept under constant pressure and/or constant temperature at choice, and this ensures a reliable and regulated supply of drying medium to the different stages, and far better than if the drying medium were to be led directly from the furnace, for instance, in parallel pipes. By means of the distributing chamber a far better and quicker mixing of the gas is obtained, and besides it becomes possible by means of a *joint* adjustment of the temperture in the distributing chamber (i.e. with a regulator) to adapt the supply of heat from the furnace according to the requirements of the plant at any time, and in such manner that it is the *total* heat requirement which forms the basis. With direct supply from the furnace to the individual drying stages, *one* of these is bound to be determinative, and the other merely follow after.

In purely installational respects a distributing chamber has great significance, whether the furnace stands alone or is combined with a heat-exchanger. The drying medium can by means of ducts be conveyed to this chamber, which is centrally located, and the plant will then get short, straight and equal suction pipes from the distributing chamber to the fans for the individual drying stages. This is important, as there are thereby obtained equal suction conditions and equal flowing and drying conditions in the individual stages. Without a distributing chamber this would be difficult to attain, and in any case it would be a much more costly arrangement and one taking up a lot more space.

It would be desirable, out of regard for the attainable capacity of some apparatus or other (e.g. a pulverizer) which is to handle the material to be dried (the pulp) before it proceeds to stage 1, to install two or more parallel intakes of the drying medium to the drying stages in question (viz. each with its pulverizer), in such manner that these two pipes, before they reach the drying fan and drying chamber, are combined into one unit. In order to effect this it is necessary to have the distributing chamber, as the two intakes can thereby be made completely symmetrical and equal, and the quantity of drying medium and the flowing conditions will be exactly the same in both intakes. This would be impossible, or at least very complicated and cumbersome, unless a distributing chamber formed part of the plant.

The invention having been described, what is claimed is:

1. In an apparatus for the drying of a finely divided material of the general class which includes wood pulp and cellulose having a number of material drying stages each having a drying unit with inflow and outflow passages connected for the passing of said material in a heated gaseous medium through said stages at temperatures approximating 500° F. in a first of said stages and 300° to 350° F. in another of said stages, the combination of a supply source for the delivery of a hot gaseous drying medium, a gas distributing chamber for massing said heated gaseous medium at controlled temperatures and in substantial quantity, an inlet connection to the distributing chamber from said source, outlet connections from said distributing chamber to the inflow passages to each said drying stage, adjustable means for controlling the temperature of the heated gas passed from said source to said chamber to maintain a controlled temperature of said heated gas in said chamber in the order of 500° F., and means for regulating the temperature of the heated gas passing through each said material drying stage including a controller responsive to variations in temperature of a first material drying stage to effect a compensating adjustment of said adjustable means, means to vary the temperature of the medium supplied from said chamber to a second stage and a controller responsive to variations in temperature of said second stage to effect a compensating adjustment of said latter temperature varying means.

2. In an apparatus for the drying of finely divided material of the general class which includes wood pulp and cellulose, having a number of sequentially arranged material drying stages each having a drying unit with inflow and outflow passages connected for the passing of said material in a heated gaseous medium through said stages at regulated temperatures at each said stage, the combination of a supply source for the delivery of a hot gaseous drying medium, a distributing chamber for massing said hot gaseous drying medium at controlled temperatures and in substantial quantity, an inlet connection to the distributing chamber from said source, outlet connections from said distributing chamber to a plurality of said drying units in said material drying stages, adjustable means for controlling the temperature of the heated gas passed from said source through said inlet into said chamber to maintain a controlled temperature of said heated gas in said chamber, and means for regulating the temperature of the heated gas passing from said outlets and chamber to selected material drying stages to maintain a constant level of said temperatures in each said stage including a controller responsive to variations in temperature of a first material drying stage to effect a compensating adjustment of said adjustable means, means to vary the temperature of the medium supplied from said chamber to a second material drying stage, and a controller responsive to variations in temperatures within said second material drying stage to effect a compensating adjustment of said latter temperature varying means.

3. In an apparatus for the drying of finely divided material of the general class which includes wood pulp and cellulose, having a first and second material drying stage, each said stage having a drying unit with inflow and outflow passages connected for the passing of said material in a heated gaseous medium through said stages, the combination of a furnace as a supply source of a hot gaseous drying medium, a distributing chamber for massing said hot gaseous drying medium at controlled temperatures and in substantial quantity, an inlet connection to the distributing chamber from said furnace, outlet connections from said distributing chamber to each said first and second stage, a first stage temperature controller having a temperature sensing element in the outflow passage of the first stage, and means connecting said temperature controller with said furnace to control the heat output of said furnace, a regulator in said outlet connection from the distributing chamber to said second stage for controlling the temperature of the heated gases passing from said chamber to the said second stage, and a second temperature controller having a temperature sensing element in the outflow passage of said second stage, and means connecting said second temperature controller with said regulator for effecting a compensating adjustment of said regulator to maintain at a substantially constant level the temperature of the mixture in said second stage.

4. In an apparatus for the drying of finely divided material of the general class which includes wood pulp and cellulose, having a first and a second material drying stage each having a drying unit with inflow and outflow passages connected for the passing of said material in a heated gaseous medium through said stages at regulated temperatures at each said stage, the combination of a high temperature source for the delivery of a hot gaseous medium, a low temperature source for the delivery of a hot gaseous medium, a distributing chamber for massing said heated gaseous medium at controlled temperatures and in substantial quantity having a high temperature section and a low temperature section, heat regulating means connecting said sections to effect an interchange of the heated gases in the respective sections, inlet connections from said high and low temperature sources respectively to said high and low temperature sections of said chamber, outlet connections from said high and low sections of said chamber to said first and second drying stages respectively, a temperature controller having a temperature sensing element in the outlet passage of said first stage connected to effect a compensating adjustment of the heat input from said high temperature source to said high temperature section, a regulator in said outlet connection from the distributing chamber to said second stage for controlling the temperature of the heated gas passing from said chamber to said second stage, a second temperature controller having a temperature sensing element in the outlet passage of said second stage and connected to effect a compensating adjustment of said regulator to maintain constant the temperature in said second stage, and a third temperature regulator having a heat sensing element in said low temperature section of the distributing chamber and connected to control the supply of heated gas from the low temperature source to the low temperature section of said distributing chamber.

5. In an apparatus for the drying of finely divided material of the general class which includes wood pulp and cellulose, a plurality of sequentially arranged drying stages through which the material is conveyed in a heated gaseous medium, said stages including drying units to which heated gas is supplied, means for generating and supplying the heated gas to said drying units comprising a high temperature source for the dilvery of a hot gaseous medium, a lower temperature source for the delivery of a hot gaseous medium at a lower temperature, a distributing chamber for massing said heated gaseous medium at controlled temperatures and in substantial quantity, said chamber having a high temperature section to which heated gas is supplied from the high temperature source and a low temperature section to which heated gas is supplied from the lower temperature source, means including a damper intermediate said high and low temperature sections of the chamber providing controlled flow communication therebetween for the heated gases, connections from the high temperature section of the chamber to a drying unit to supply gas for said unit from the high temperature section, connections from the lower temperature section to another of said drying units for supplying gas from said lower temperature section to said other drying unit, means for controlling the supply of heated gas from the high temperature and lower temperature sources to the high temperature and lower temperature sections of the chamber respectively, control means for said damper to control the flow of gases between the high temperature and lower temperature sections of the chamber, and means for regulating the temperature of the heated gas passing to the drying units from the respective sections of the chamber to maintain predetermined temperature levels in said drying stages.

References Cited by the Examiner

UNITED STATES PATENTS

| | | | |
|---|---|---|---|
| 952,775 | 3/1910 | Whitlach | 34—54 |
| 1,528,995 | 3/1925 | Singer | 34—10 |
| 1,539,588 | 5/1925 | Muller | 34—34 X |
| 1,766,030 | 6/1930 | Meakin | 34—57 |
| 2,068,077 | 1/1937 | Rosin et al. | 34—57 |
| 2,069,873 | 2/1937 | Chenault | 34—10 X |
| 2,095,446 | 10/1937 | Lee | 34—54 X |
| 2,270,111 | 1/1942 | Daley | 34—54 X |
| 2,501,487 | 3/1950 | Whitman | 34—57 |
| 2,525,535 | 10/1950 | Erisman et al. | 34—54 |
| 2,629,938 | 3/1953 | Montgomery. | |

WILLIAM F. O'DEA, *Primary Examiner.*

GEORGE D. MITCHELL, *Examiner.*

J. SOFER, D. A. TAMBURRO, *Assistant Examiners.*